US010321144B2

(12) United States Patent
Sevin et al.

(10) Patent No.: US 10,321,144 B2
(45) Date of Patent: Jun. 11, 2019

(54) METHOD AND SYSTEM FOR DETERMINING ENCODING PARAMETERS OF VIDEO SOURCES IN LARGE SCALE VIDEO SURVEILLANCE SYSTEMS

(71) Applicant: CANON KABUSHIKI KAISHA, Tokyo (JP)

(72) Inventors: Julien Sevin, Saint Aubin du Cormier (FR); Pierre Visa, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/818,396

(22) Filed: Nov. 20, 2017

(65) Prior Publication Data

US 2018/0152715 A1 May 31, 2018

(30) Foreign Application Priority Data

Nov. 25, 2016 (GB) .................................. 1620011.5

(51) Int. Cl.
*H04N 7/18* (2006.01)
*H04N 19/40* (2014.01)
(Continued)

(52) U.S. Cl.
CPC ........... *H04N 19/40* (2014.11); *H04N 7/0102* (2013.01); *H04N 7/181* (2013.01); *H04N 19/103* (2014.11);
(Continued)

(58) Field of Classification Search
CPC ...... H04N 19/40; H04N 19/85; H04N 19/103; H04N 19/124; H04N 19/136;
(Continued)

(56) References Cited

U.S. PATENT DOCUMENTS

| 5,440,346 A | 8/1995 | Alattar et al. |
| 2006/0088092 A1* | 4/2006 | Chen ................ G08B 13/19656 348/155 |
| 2011/0051808 A1* | 3/2011 | Quast ....................... H04N 7/18 375/240.08 |

FOREIGN PATENT DOCUMENTS

EP    3089453 A1    11/2016

* cited by examiner

*Primary Examiner* — Sherrie Hsia
(74) *Attorney, Agent, or Firm* — Canon USA, Inc. I.P. Division

(57) ABSTRACT

At least one embodiment of a method of configuring a video source comprising an embedded encoder for generating a stream, in a video-surveillance system comprising virtual encoders generating virtual streams, the method comprising:
  transcoding a reference stream generated by the video source to generate virtual streams according to distinct encoding configurations of the virtual encoders;
  for each of the generated virtual streams, computing a similarity distance between the corresponding virtual stream and a reference stream generated by the video source;
  obtaining a quality indicator relative to a task to be carried out on a stream generated by the video source;
  selecting an encoding configuration of a virtual encoder based on the computed similarity distances and the obtained quality indicator; and
  determining at least one configuration parameter value of the encoder of the video source as a function of the selected encoding configuration of the virtual encoder and of a look-up table.

20 Claims, 7 Drawing Sheets

(51) Int. Cl.
  *H04N 7/01* (2006.01)
  *H04N 19/154* (2014.01)
  *H04N 19/184* (2014.01)
  *H04N 19/85* (2014.01)
  *H04N 19/103* (2014.01)
  *H04N 19/124* (2014.01)
  *H04N 19/136* (2014.01)

(52) U.S. Cl.
  CPC ......... *H04N 19/124* (2014.11); *H04N 19/136* (2014.11); *H04N 19/154* (2014.11); *H04N 19/184* (2014.11); *H04N 19/85* (2014.11)

(58) Field of Classification Search
  CPC .... H04N 19/154; H04N 19/184; H04N 7/181; H04N 7/0102; H04N 7/18
  USPC ...... 348/143, 155, 460; 375/240.01; 725/62, 725/81
  See application file for complete search history.

METHOD AND SYSTEM FOR DETERMINING ENCODING PARAMETERS OF VIDEO SOURCES IN LARGE SCALE VIDEO SURVEILLANCE SYSTEMS

CROSS REFERENCE TO RELATED APPLICATION

This application claims the benefit under 35 U.S.C. § 119(a)-(d) of United Kingdom Patent Application No. 1620011.5, filed on Nov. 25, 2016 and entitled "method and system for determining encoding parameters of video sources in large scale video surveillance systems". The above cited patent application is incorporated herein by reference in its entirety.

FIELD OF THE INVENTION

The present invention relates to the technical field of video surveillance systems and more particularly to a method and a system for determining encoding parameters of video sources in large scale video surveillance systems.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal events detection, traffic monitoring, customer behaviour, or general data gathering.

Video surveillance systems often comprise a huge number of network cameras that can be made by different manufacturers and that can be of different types. Each network camera typically comprises video stream encoders that make it possible to transmit encoded video stream over a communication network, for example to servers, to be recorded and displayed in real-time to human operators or analysed for objection recognition.

Configuring a network camera is not easy. In particular, setting the video stream encoders of the network camera can be complex for users that are not familiar with each type of network camera. Moreover, the setting of video stream cameras may depend on the tasks to be performed.

Such a complexity results from the great number of parameters that may for example comprise a video resolution, a video codec, a bitrate control, a frame rate, a video quality, and a Group of Pictures (GoP). It also results from the technical nature of these parameters and from their impacts that are not directly known and visible to the one setting the parameters, for example in terms of image quality, network bandwidth, and resource consumption.

To set the parameters properly, it is needed to take into account the usage of the stream(s) generated by a network camera to adapt the configuration of its video encoder(s). Typical usages of video streams in a video surveillance system are live viewing, recording (for the retrieval and viewing of video such as for a post-event investigation) and Video Content Analytics (VCA) which is based on video analysis to perform dedicated tasks such as face detection or recognition, people tracking, or license plate reading. Each usage requires a given (minimum) quality of the stream generated by a video encoder.

Moreover, while the format of the outputs of the encoders generally conforms to a standard, the manufacturers implement their own encoders, resulting in manufacturer-dependent configuration. It is also to be noted that each manufacturer continuously improves its encoders to improve its performance, resulting in variation of configuration. As a consequence, an administrator or the one who is in charge of configuring the encoders doesn't know which encoder is embedded in a given camera and thus cannot make an a priori determination of an optimal configuration. This means that a dedicated configuration needs to be learned for each manufacturer and model. Moreover, the list of settable encoding parameters is not necessarily the same between two different cameras and in particular, a same encoding parameter may have a unit and/or a scale different between two cameras.

Consequently, the administrator or the one who is in charge of configuring the cameras needs to configure each camera individually, according to its manufacturer, its model, and the task to be carried out. The problem is complex for a given network and becomes even difficult and quite unrealistic in large scale video surveillance systems, in terms of complexity and worktime.

SUMMARY OF THE INVENTION

The present invention has been devised to address one or more of the foregoing concerns.

In this context, there is provided a solution for determining encoding parameters of video sources in large scale video surveillance systems.

According to a first object of the invention, there is provided a method of configuring a video source comprising an embedded encoder for generating a stream, the embedded encoder having at least one configuration parameter, at least one configuration parameter value making it possible to generate a reference stream, in a video-surveillance system comprising at least one virtual encoder configured to generate a plurality of virtual streams each corresponding to a distinct encoding configuration, each of the virtual streams being generated from a reference stream generated by the video source, the method comprising:

transcoding a reference stream generated by the video source to generate virtual streams according to distinct encoding configurations of the at least one virtual encoder;

for each of the generated virtual streams, computing a similarity distance between the corresponding virtual stream and a reference stream generated by the video source;

obtaining a quality indicator relative to a task to be carried out on a stream generated by the video source;

selecting an encoding configuration of the at least one virtual encoder based on the computed similarity distances and the obtained quality indicator; and determining at least one configuration parameter value of the encoder of the video source as a function of the selected encoding configuration of the at least one virtual encoder and of a look-up table.

According to the method of the invention, an efficient configuration of a video source may be determined automatically or quasi automatically, without requiring specific knowledge from an administrator, as a function of a task to be carried out on a stream generated by the video source. This makes a video surveillance system easier and quicker to install and to set.

In an embodiment, the method further comprises a step of generating the look-up table so as to determine an efficient configuration of a video source as a function of the output of the video source, independently from its theoretical characteristics.

Generating the look-up table may comprise the steps of:

retrieving a stream generated by the embedded encoder of the video source configured with at least one predetermined parameter value;

transcoding the reference stream by using each of the distinct encoding configurations of the at least one virtual encoder so as to obtain virtual streams; and selecting an encoding configuration of the at least one virtual encoder based on similarity distances between the retrieved stream and the virtual streams.

In an embodiment, the step of generating the look-up table further comprises:

obtaining a list of streams, each stream of the list of streams being generated by the embedded encoder of the video source configured with at least one predetermined distinct parameter value;

retrieving each stream of the list of streams; and for each retrieved stream, selecting an encoding configuration of the at least one virtual encoder based on similarity distances between the retrieved streams and the virtual streams.

In an embodiment, the step of generating the look-up table further comprises a step of computing similarity distances between a retrieved stream and the virtual streams making it possible to select a configuration of a virtual encoder.

In an embodiment, the method further comprises a step of computing a quantization parameter from a stream generated by the embedded encoder, the quantification parameter characterizing the configuration of the embedded encoder.

In an embodiment, the distinct encoding configurations of the at least one virtual encoder are distinct variable bitrate encoding configurations.

In an embodiment, the look-up table comprises links between values of a compression quality parameter of a retrieved stream, of a quantization parameter of the embedded encoder, and of a quantization parameter of a selected virtual encoder.

In an embodiment, the method further comprises a step of computing a target bitrate from a stream generated by the embedded encoder, the target bitrate characterizing the configuration of the embedded encoder.

In an embodiment, the frame rate of the reference stream is modified to be set to the frame rate of a stream generated by the embedded encoder and the distinct encoding configurations of the at least one virtual encoder are distinct constant bitrate encoding configurations.

In an embodiment, the look-up table comprises links between values of a target bit rate of a retrieved stream, of a target bit rate of the embedded encoder, of a target bit rate of a selected virtual encoder, and of a frame rate of the embedded encoder.

In an embodiment, computation of a similarity distance is based on a full-reference metric used in computer vision in order to assess the image visual quality such as the Peak Signal-to-Noise Ratio (PSNR) and the Structural Similarity Image Metric (SSIM).

In an embodiment, the video-surveillance system comprises a plurality of virtual encoders, each virtual encoder of the plurality of virtual encoders being configured according to a distinct encoding configuration of the distinct encoding configurations.

In an embodiment, the video-surveillance system comprises one virtual encoder, the virtual encoder being sequentially configured according to each of the distinct encoding configurations.

According to a second object of the invention, there is provided a device for configuring a video source comprising an embedded encoder for generating a stream, the embedded encoder having at least one configuration parameter, at least one configuration parameter value making it possible to generate a reference stream, in a video-surveillance system comprising at least one virtual encoder configured to generate a plurality of virtual streams each corresponding to a distinct encoding configuration, each of the virtual streams being generated from a reference stream generated by the video source, the device comprising a microprocessor configured for carrying out the steps of:

transcoding a reference stream generated by the video source to generate virtual streams according to distinct encoding configurations of the at least one virtual encoder;

for each of the generated virtual streams, computing a similarity distance between the corresponding virtual stream and a reference stream generated by the video source;

obtaining a quality indicator relative to a task to be carried out on a stream generated by the video source;

selecting an encoding configuration of the at least one virtual encoder based on the computed similarity distances and the obtained quality indicator; and determining at least one configuration parameter value of the encoder of the video source as a function of the selected encoding configuration of the at least one virtual encoder and of a look-up table.

According to the device of the invention, an efficient configuration of a video source may be determined automatically or quasi automatically, without requiring specific knowledge from an administrator, as a function of a task to be carried out on a stream generated by the video source. This makes a video surveillance system easier and quicker to install and to set.

In an embodiment, the microprocessor is further configured for carrying out a step of generating the look-up table so as to make it possible to determine an efficient configuration of a video source as a function of the output of the video source, independently from its theoretical characteristics.

In an embodiment, the microprocessor is configured so that the step of generating the look-up table comprises:

retrieving a stream generated by the embedded encoder of the video source configured with at least one predetermined parameter value;

transcoding the reference stream by using each of the distinct encoding configurations of the at least one virtual encoder so as to obtain virtual streams; and selecting an encoding configuration of the at least one virtual encoder based on similarity distances between the retrieved stream and the virtual streams.

In an embodiment, the microprocessor is configured so that the step of generating the look-up table further comprises:

obtaining a list of streams, each stream of the list of streams being generated by the embedded encoder of the video source configured with at least one predetermined distinct parameter value;

retrieving each stream of the list of streams; and for each retrieved stream, selecting an encoding configuration of the at least one virtual encoder based on similarity distances between the retrieved streams and the virtual streams.

In an embodiment, the microprocessor is configured so that the step of generating the look-up table further comprises a step of computing similarity distances between a retrieved stream and the virtual streams.

In an embodiment, the microprocessor is further configured for carrying out a step of computing a quantization parameter from a stream generated by the embedded encoder, the quantification parameter characterizing the configuration of the embedded encoder.

In an embodiment, the microprocessor is further configured for carrying out a step of computing a target bitrate from a stream generated by the embedded encoder, the target bitrate characterizing the configuration of the embedded encoder.

In an embodiment, the microprocessor is configured so that computation of a similarity distance is based on a full-reference metric used in computer vision in order to assess the image visual quality such as the Peak Signal-to-Noise Ratio (PSNR) and the Structural Similarity Image Metric (SSIM).

In an embodiment, the video-surveillance system comprises a plurality of virtual encoders, each virtual encoder of the plurality of virtual encoders being configured according to a distinct encoding configuration of the distinct encoding configurations.

In an embodiment, the video-surveillance system comprises one virtual encoder, the virtual encoder being sequentially configured according to each of the distinct encoding configurations.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Figure 1:
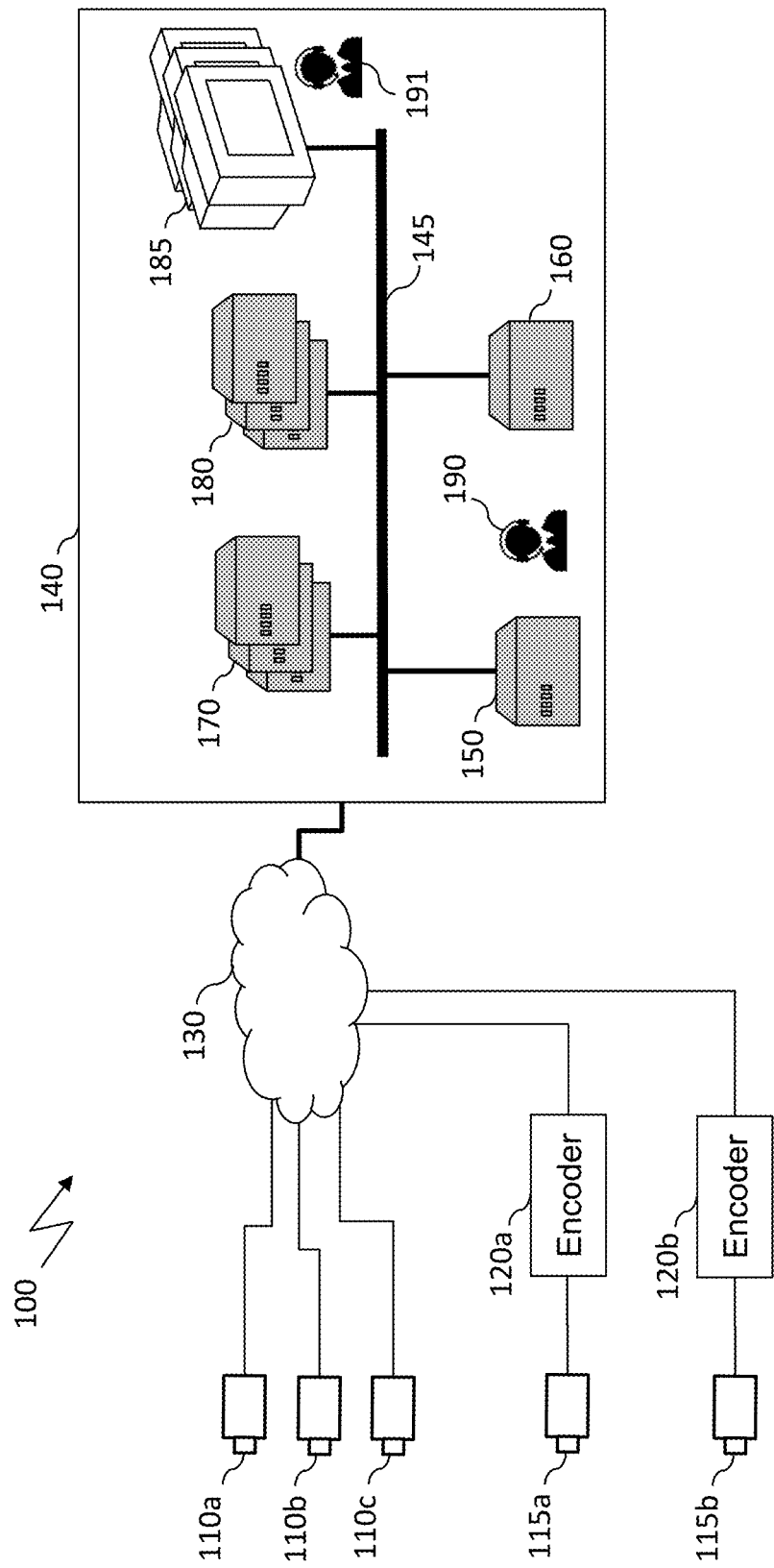
FIG. 1 schematically illustrates an example of a video surveillance system wherein embodiments of the invention may be implemented.

FIG. 1 schematically illustrates an example of a video surveillance (VS) system wherein embodiments of the invention may be implemented.

VS system 100 includes a plurality of network cameras denoted 110a, 110b, and 110c, for example network cameras of the Internet Protocol (IP) type, generically referred to as IP cameras 110, and a plurality of video encoders denoted 120a and 120b, generally referred to as video encoders 120, which may connected to one or more network cameras, for example to IP or analog cameras 115a and 115b.

Network cameras 110 and video encoders 120 are referred to as source devices that can be identified by a manufacturer reference and a model reference. Two source devices are considered similar if they have been made by the same manufacturer and if they are of the same model. Otherwise, they are considered as different.

Each source device embeds at least one video encoder which is referred to as a source video encoder. From an implementation point of view, a source device may contain several encoder chips, for example several H.264 encoder chips. In such a case, each source video encoder is associated with one encoder chip (e.g. one H.264 encoder chip). Alternatively, a source device may contain only one (powerful) encoder chip, for example one (powerful) H.264 encoder chip, which can be shared by multiple source video encoders.

It is to be noted here that a video encoder has numerous adjustable parameters, referred to as encoding parameters, used to determine a level of overall video compression (characterized by an encoded bitrate and thereby a decoded video quality level). An encoding parameter which is user-settable (via a dedicated interface) is referred to as a settable encoding parameter.

The list of settable encoding parameters for a given video encoder is referred to as the settable encoding list. The settable encoding list and the value set for each settable encoding parameter of the settable encoding list corresponds to the encoder configuration of the given video encoder. The set of all settable encoding parameters may differ from one source video encoder to another. The typical settable encoding parameters are:
  the pixel resolution which corresponds to the total number of pixels in each horizontal and vertical dimension of each image of the captured video;
  the frame rate which corresponds to the number of individual encoded video frames transmitted per time unit. It may be provided as a number of frames per second (fps) to indicate how many images are transferred within one second;
  the video codec. Two well-known video codecs used in a VS system are Motion-JPEG (MJPEG) and H.264 (also known as MPEG-4 Part 10/AVC for Advanced Video Coding). For the sake of illustration, the following description is based on the H.264 codec. However, embodiments of the invention may be based on other codecs such as MJPEG. For H264, profiles corresponding to the features/capabilities that the encoder can use may be defined. Each profile offers different codec efficiencies affecting the overall image quality of the transmitted video as well as the bandwidth and storage consumption. Different H.264 profiles are available and three of them are very common in video surveillance applications: baseline profile (which is one the least efficient in terms of image quality, of lowest cost of implementation, and of lowest processing requirements), main profile, and high profile (one of the most efficient in terms of image quality, of highest cost of implementation, and of highest processing requirements);

the bitrate control which is a parameter used for controlling the data transfer rate produced by the codec. Most of source devices support two bitrate controls, constant bitrate (CBR) and variable bitrate (VBR):

according to constant bitrate, the image quality is adapted to match a target data transfer rate corresponding to the maximum data authorized by the codec to be transmitted. This parameter is referred to as target bitrate; and, according to variable bitrate, the data transfer rate is automatically adapted by the codec to match a desired image quality. The image quality is defined by a parameter called compression quality or quantization factor corresponding to the compression level used by a codec to convert raw video data into an encoded format. A key point is that there is no reference scale for the compression quality, the scale varies according to the manufacturer.

The encoder configuration of a source video encoder is referred to as source encoder configuration.

As mentioned above, the source devices may be made by different manufacturers and may be of different types. Therefore, the settable encoding list may be different from one to another.

The encoded video generated by a digital video encoder according to its configuration (encoder configuration) is referred to as a video stream. The network cost of the video stream corresponds to its bitrate, that is to say the amount of data sent in the network per time unit.

A video stream generated by a source video encoder is referred to as a source video stream. The reference source video stream corresponds to the best source video stream that the source video encoder can generate in terms of overall image quality (or one of the best). The corresponding source encoder configuration is referred to as reference source encoder configuration. For instance, a reference source encoder configuration based on only typical settable encoding parameters is:

a pixel resolution set to the maximum resolution supported by the source video encoder, a frame rate set to the maximum frame rate supported by the source video encoder, a codec parameter set, for example, to H264 with the "best" H264 profile supported the source video encoder (firstly, "high", if not available, "main", and if not available "baseline"), and a bitrate control set to "VBR" with the compression quality sets to the maximum quality supported by the source video encoder (corresponding to the lowest compression).

With each video stream generated by a video encoder there is associated a video surveillance task corresponding to the usage of the video stream in the VS system 100. Three main video surveillance tasks are very common in a video surveillance system:

live viewing;

recording for the retrieval and viewing of video such as for a post-event investigation; and Video Content Analytics (VCA) based on a video analysis to perform dedicated tasks such as face detection or recognition, people tracking, or license plate reading.

With each video surveillance task there is associated a quality of service (QoS), referred to as the task target QoS of the task, corresponding to the minimum performance that the task need to have to be considered operational. For a viewing task, it corresponds to a target visual quality. For a given VCA, it corresponds to a target VCA accuracy corresponding to the accuracy of the VCA algorithm. The target QoS of the task is either set automatically or by an administrator.

A task quality indicator is defined for each video surveillance task corresponding to the minimum quality that the streams associated with the video surveillance task need to have to achieve the target QoS of the task. The correspondence between the task target QoS and the task quality indicator is assumed to be known (e.g., predetermined).

Turning back to FIG. 1, source devices 110 and 120 are connected to a central site 140 via a backbone network 130. In a large video surveillance system, backbone network 130 is typically a wide area network (WAN) such as the Internet.

According to the illustrated example, central site 140 comprises a video manager system (VMS) 150 used to manage the VS system, an auto-setting server 160 used to perform an automatic setting of the encoding parameters, and a set of recording servers 170 configured to store the received video streams, a set of video content analytics (VCA) servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

VMS 150 may be a device containing a software module that makes it possible to configure, control, and manage the VS system, for example via an administration interface. Such tasks are typically carried out by an administrator (e.g. administrator 190) who is in charge of configuring the overall video surveillance system. In particular, administrator 190 may use VMS 150 to select a source encoder configuration for each source device of the video surveillance system. In the state of the art, it is the only means to configure the source video encoders.

The set of displays 185 may be used by operators (e.g. operators 191) to watch the video streams corresponding to the scenes shot by the cameras of the VS system.

The auto-setting server 160 contains a module for setting automatically or almost automatically the encoding parameters. It is described in more detail by reference to FIG. 2.

Administrator 190 may use the administration interface of VMS 150 to set input parameters of the auto-setting algorithm described with reference to FIGS. 5 and 8. A key input parameter to set by the administrator is a quality indicator associated with each video surveillance task.

Figure 2:
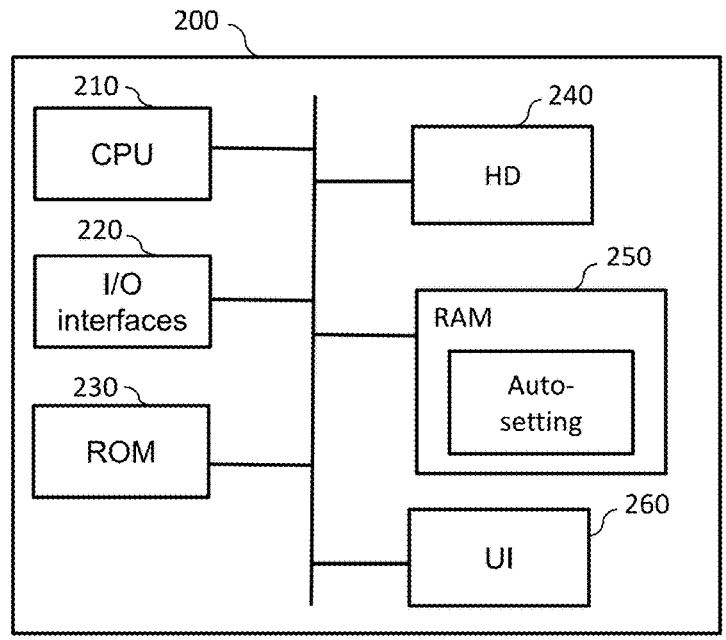
FIG. 2 is a schematic block diagram of a computing device for implementing embodiments of the invention.

FIG. 2 is a schematic block diagram of a computing device for implementing embodiments of the invention. It may be embedded in auto-setting server 160 described with reference to FIG. 1.

The computing device 200 comprises a communication bus connected to:
- a central processing unit 210, such as a microprocessor, denoted CPU;
- an I/O module 220 for receiving data from and sending data to external devices. In particular, it may be used to retrieve video streams from source devices as described with reference to FIG. 8;
- a read only memory 230, denoted ROM, for storing computer programs for implementing embodiments. It may also be used to store look-up tables that are specific to each source device, as described with reference to Tables 1 and 2 of the Appendix;
- a hard disk 240 denoted HD;
- a random access memory 250, denoted RAM, for storing the executable code of the method of embodiments of the invention, in particular an auto-setting algorithm, as well as registers adapted to record variables and parameters;
- a user interface 260, denoted UI, used to configure input parameters of embodiments of the invention. As mentioned above, an administration user interface may be used by an administrator of the VS system.

The executable code may be stored either in random access only memory 250, in hard disk 240, or in a removable digital medium (not represented) such as a disk of a memory card.

The central processing unit 210 is adapted to control and direct the execution of the instructions or portions of software code of the program or programs according to embodiments of the invention, which instructions are stored in one of the aforementioned storage means. After powering on, CPU 210 may execute instructions from main RAM memory 250 relating to a software application after those instructions have been loaded, for example, from the program ROM 230 or hard-disc 240.

Figure 3:
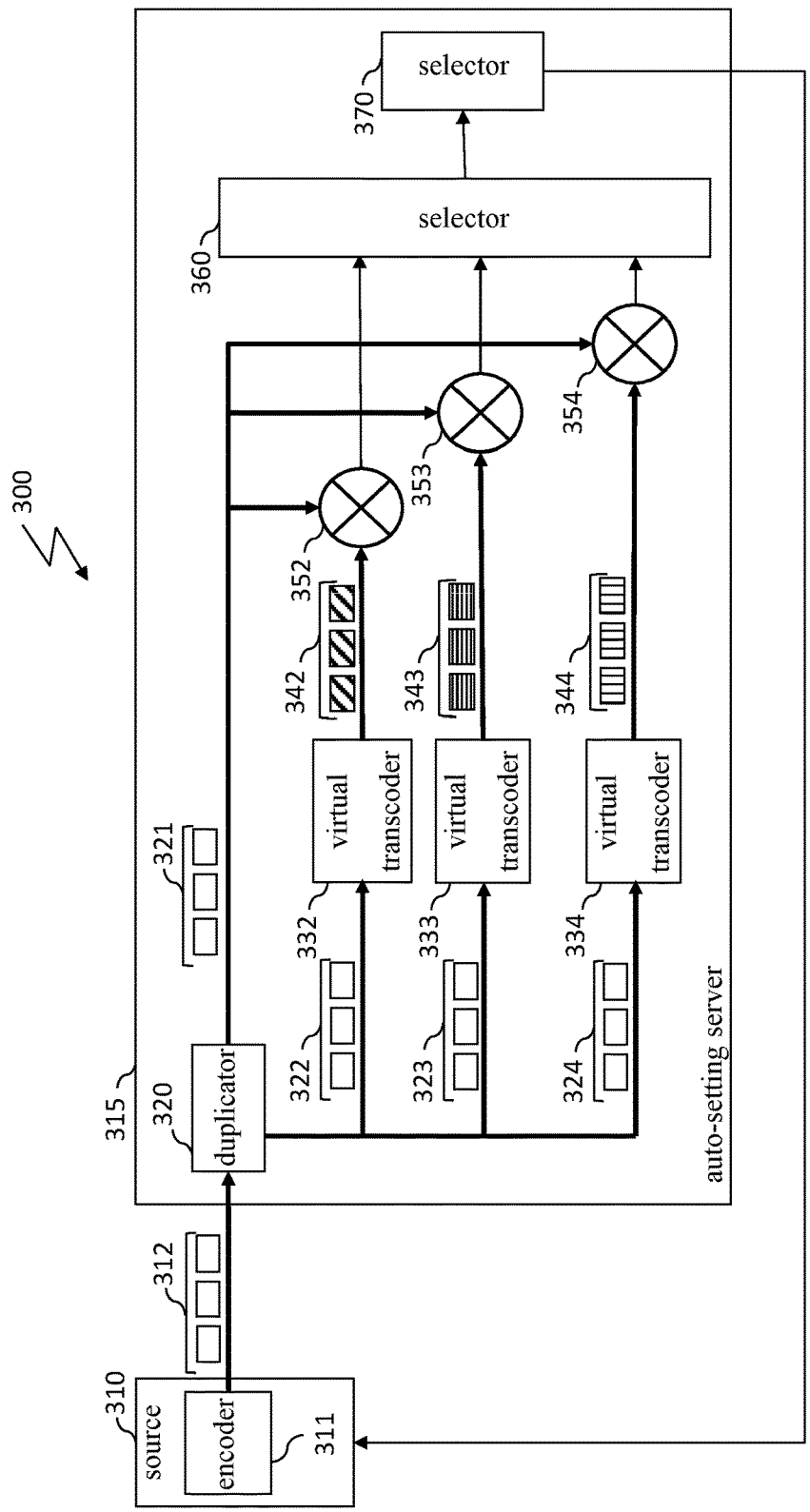
FIG. 3 is a block diagram of an example of an auto-setting system making it possible to set automatically encoding parameters of a source device according to embodiments of the invention.

FIG. 3 is a block diagram of an example of an auto-setting system making it possible to set automatically encoding parameters of a source device according to embodiments of the invention.

Auto-setting system 300 contains one source device 310 (for example one source device chosen from among the source devices illustrated in FIG. 1) and auto-setting server 315 (for example the auto-setting server 160 illustrated in FIG. 1).

As illustrated, source device 310 contains only one source video encoder denoted 311. Source video encoder 311 is set with a reference source encoder configuration and generates reference source video stream 312 that is sent to auto-setting server 315 and more precisely to module 320 of auto-setting server 315.

Module 320 aims at duplicating an input video stream into several copies of the input video stream. According to the illustrated example, reference source video stream 312 is duplicated into four reference source video streams denoted 321, 322, 323, and 324 that are identical to reference source video stream 312. Video stream 322 is sent to module 332, video stream 323 is sent to module 333, and video stream 324 is sent to module 334.

Modules 332, 333, and 334 are virtual video transcoders that is to say video transcoders (each comprising a video decoder referred to as a virtual video decoder and a video encoder referred to as a virtual video encoder) implemented within the auto-setting server.

Each virtual transcoder may be based on a hardware solution or on a software solution. For the sake of illustration, the virtual transcoder may be based on the free software library x264 which provides a library for encoding video streams into the H.264/MPEG-4 AVC compression format. In a hardware solution, the auto-setting server may for example contain several encoder chips (e.g. several H.264 encoder chips), each virtual video encoder being associated with one encoder chip. In other implementations, the auto-setting server may for example contain only one (powerful) encoder chip (e.g. one H.264 encoder chip which can be shared by multiple virtual video encoders. In a software solution, the encoder processes are either launched in parallel or sequentially.

The encoder configuration of a virtual encoder is referred to as virtual encoder configuration. When the bitrate control is set to VBR, the compression quality may correspond directly to the quantization parameter defined in the standard known as H.264/AVC Video Coding Standard (also known as MPEG-4 Part 10/AVC for Advanced Video Coding).

A video stream generated by a virtual video encoder is referred to as virtual video stream.

According to particular embodiments, all the virtual encoders of the auto-setting server are identical in terms of implementation and are based on the same encoding and decoding algorithms so as to create a common reference. Indeed, a VS system typically contains several different source devices each including one different source video encoder. Accordingly, the virtual encoders are used as reference encoders in order to set "generically" all source video encoders. Nevertheless, a different virtual encoder configuration is applied to each virtual video encoder, as explained hereafter.

Turning back to FIG. 3, it is to be noted that virtual video transcoders 332, 333, and 334 may be three different virtual video transcoders (according to the illustrated example) or may be a single virtual video transcoder configured to apply different encoding configurations. A specific virtual encoder configuration is associated with each virtual video encoder of the video transcoders 332, 333, and 334.

As illustrated, virtual video transcoder 332 processes reference source video stream 322 to generate virtual video stream 342 while virtual video transcoder 333 processes reference source video stream 323 to generate virtual video stream 343, and virtual video transcoder 334 processes reference source video stream 324 to generate virtual video stream 344.

Virtual video stream 342 is transmitted to module 352 that compares this virtual video stream with reference source video stream 321. The comparison may be based on a full-reference metric used in computer vision in order to assess the image visual quality such as the Peak Signal-to-Noise Ratio (PSNR) and the Structural Similarity Image Metric (SSIM).

The result of the comparison is referred to as a similarity distance.

Likewise, virtual video stream 343 is transmitted to module 353 that compares this virtual video stream with reference source video stream 321 and virtual video stream 344 is transmitted to module 354 that compares this virtual video stream with reference source video stream 321.

Accordingly, a similarity distance is computed for each virtual encoder configuration (and consequently for each virtual video encoder) and sent to module 360.

According to particular embodiments, module 360 selects one virtual encoder configuration for which the similarity distance is above a task quality indicator associated with the video surveillance task to which the source video streams are dedicated. According to other embodiments, module 360 selects the virtual encoder configuration generating the source video stream with the minimum network cost for which the corresponding similarity distance is above the task quality indicator.

The virtual encoder configuration selected by module 360 is sent to module 370.

Module 370 selects the source encoder configuration corresponding to the virtual encoder configuration received from module 360. Such selection may be based on tables of correspondence, for example a look-up table associated with the considered source device. Such tables may be constructed beforehand during an initialization phase as described with reference to FIG. 7 and Tables 1 and 2 in the Appendix.

Finally, the source encoder configuration selected by module 370 is sent to source device 310 so as to be set and used in operation mode.

Figure 4:
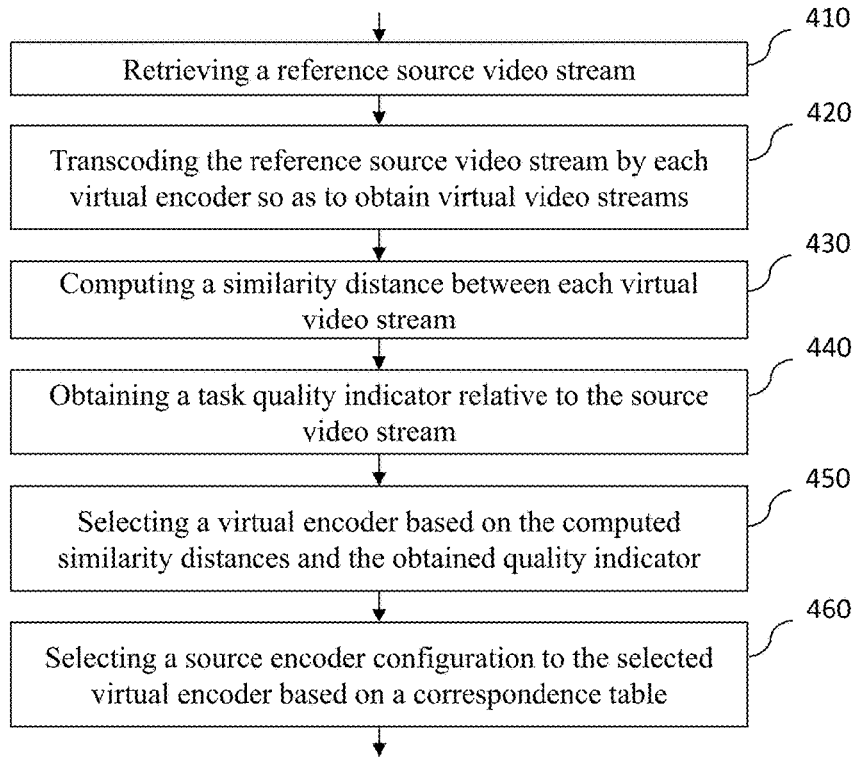
FIG. 4 is a diagram representing steps of an algorithm used for performing an automatic setting of the encoding parameters of a source device according to embodiments of the invention.

FIG. 4 is a diagram representing steps of an algorithm used for performing an automatic setting of the encoding parameters of a source device according to embodiments of the invention. It is performed during a training period preceding an operational period of the VS system.

It is to be noted that steps of FIG. 4 (and of FIG. 7 described hereafter) may be implemented in software by execution of a set of instructions or a program in a programmable computing machine, such as a personal computer (PC), a digital signal processor (DSP), or a microcontroller. They may also be implemented in hardware in a machine or in a dedicated component, such as a field-programmable gate array (FPGA) or an application-specific integrated circuit (ASIC).

The algorithm illustrated in FIG. 4 is preferably carried out for each source video stream generated by each source device of the VS system. It is based on look-up tables that are specific to each different source device and considered bitrate control. The construction of these look-up tables is described by reference to FIGS. 5 to 7.

According to particular embodiments, the algorithm illustrated in FIG. 4 is implemented within an auto-setting server, for example auto-setting server 315 in FIG. 3. The look-up tables may be stored in memory, for example in RAM 250 in FIG. 2.

For the sake of clarity, it is assumed that one look-up table is associated with each source device and that the considered source device is denoted test_src_device. It is also assumed that each look-up table comprises a reference to all the virtual encoder configurations associated with the considered source device.

Each virtual encoder configuration referenced in the look-up table of the test_src_device source device is considered. Therefore, the number of virtual encoder configurations to be considered, denoted nb_virtual_conf, corresponds to the number of virtual encoder configurations included in the look-up table related to the source device test_src_device. A virtual video encoder is associated with each virtual encoder configuration.

As illustrated in FIG. 4, a first step is directed to retrieving a reference source video stream of source device test_src_device (step 410). This step is described by reference to FIG. 8.

Next, the reference source video stream is duplicated nb_virtual_conf times to generate nb_virtual_conf copies of the reference source video stream (step 420), as described with reference to module 320 in FIG. 3. Each copy is sent to a virtual video transcoder (e.g. virtual video transcoders 332, 333, and 334 in FIG. 3), set with a specific virtual encoder configuration.

Each copy of the reference source video stream retrieved at step 410 is then transcoded by a corresponding virtual video transcoder.

In a next step (step 430), a similarity distance between the reference source video stream and each transcoded copy of the reference source video stream is computed and a task quality indicator relative to the video surveillance task to which the source video stream is dedicated is obtained (step 440). For example, the task quality indicator may be set by the administrator via the user interface 260.

Next, a virtual encoder configuration is selected (step 450). According to particular embodiments, such a selection is based on a comparison of the computed similarity distances with the task quality indicator so as to select one virtual encoder configuration for which the similarity distance is above a task quality indicator associated with the video surveillance task to which the source video streams are dedicated. According to other embodiments, the virtual encoder configuration generating the source video stream with the minimum network cost for which the corresponding similarity distance is above the task quality indicator is selected.

Figure 7:
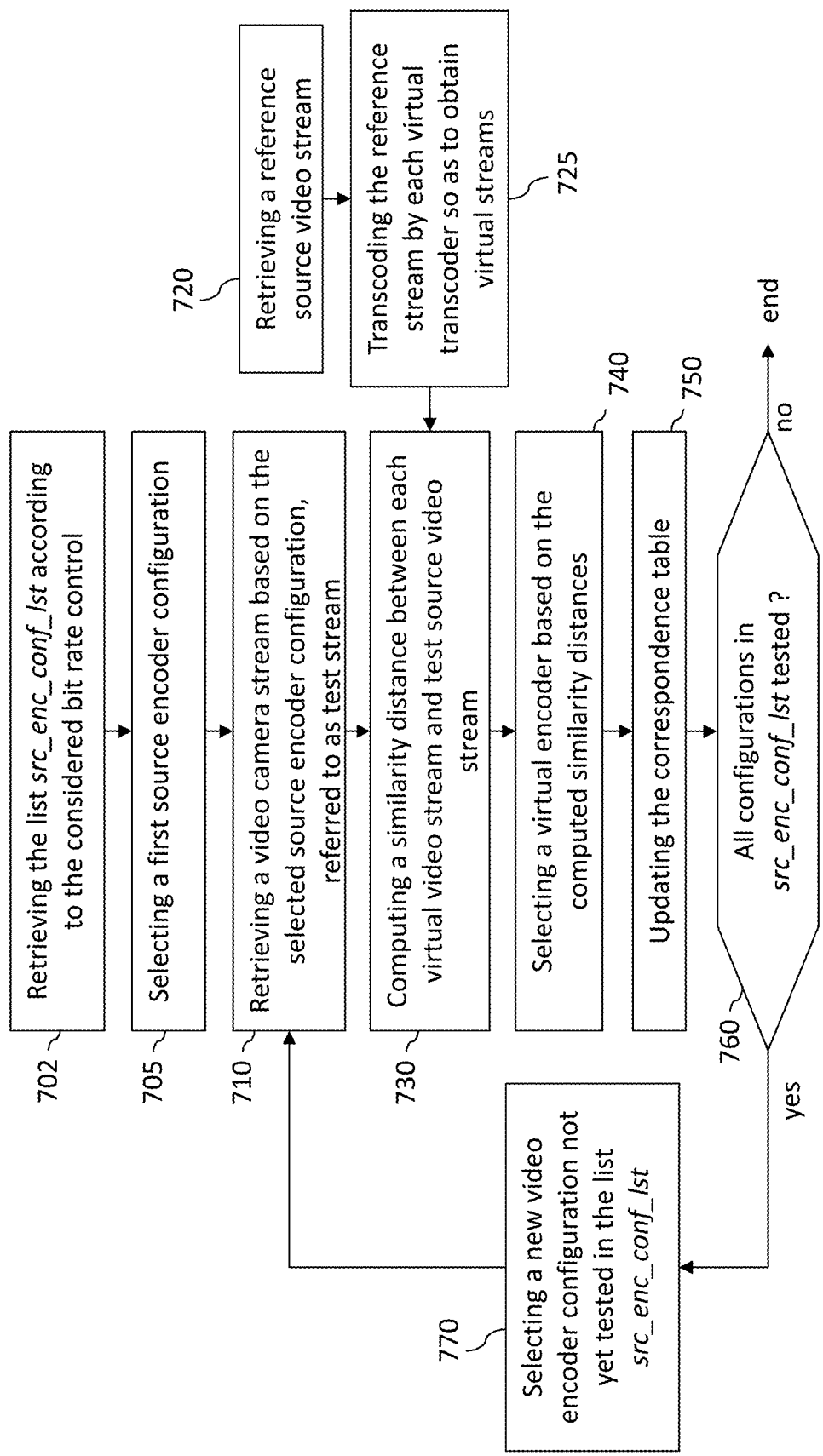
FIG. 7 is a flowchart representing steps of an algorithm that may be used for building a look-up table of a source device according to embodiments of the invention.

Next, the source encoder configuration corresponding to the selected virtual encoder configuration is determined by using the look-up table corresponding to the source device, which has been constructed beforehand during an initialization phase as described in reference to FIG. 7 and to Tables 1 and 2 in the Appendix.

Finally, the determined source encoder configuration is sent to source device test_src_device so as to be set and used during an operation mode.

Figure 5:
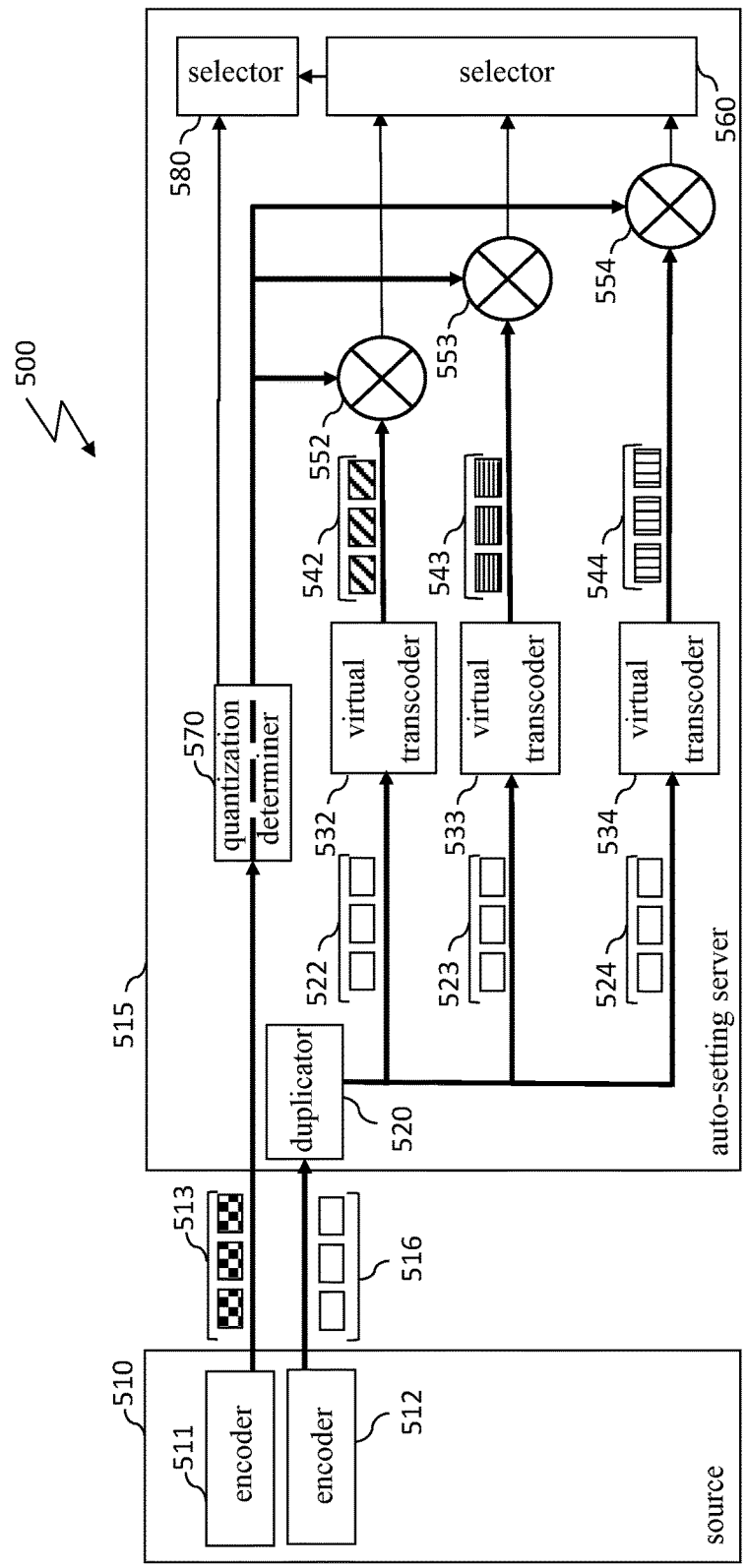
FIG. 5 is a block diagram of an example of a system for building a look-up table of a source device having a bitrate control set to variable bit rate.

FIG. 5 is a block diagram of an example of a system for building a look-up table of a source device having a bitrate control set to Variable Bit Rate (VBR).

A VBR look-up table makes the correspondence between a list of source encoder configurations and the corresponding selected virtual encoder configurations when the bitrate control of the source device is set to VBR.

This table makes it possible to determine, for a given source encoder configuration, a virtual encoder configuration for which the corresponding virtual encoder generates the closest virtual stream from a source video stream generated by the source video encoder set with the given source encoder configuration. According to particular embodiments, determination of the closest virtual stream comprises determining similarities based on a full-reference metric such as Peak Signal-to-Noise Ratio (PSNR) and Structural Similarity Image Metric (SSIM).

As illustrated, system 500 comprises one source device 510 (for example one source device chosen from among the source devices illustrated in FIG. 1) and an auto-setting server 515 (for example the auto-setting server 160 illustrated in FIG. 1).

For the sake of illustration, source device 510 contains two source video encoders denoted 511 and 512. Source video encoder 511 is set according to a given source encoder configuration (different from the reference source encoder configuration), denoted tested_VBR_conf, for which the bitrate control is set to VBR. The source encoder configuration tested_VBR_conf may be identified by its compression quality. The compression quality of the encoder configuration tested_VBR_conf is denoted tested_conf_quality.

Source video encoder 511 generates a source video stream 513 which is sent to module 570.

Source video encoder 512 is set with the reference source encoder configuration. It generates reference source video stream 516 which is sent to module 520.

Like module 320 described in reference to FIG. 3, module 520 aims at duplicating an input video stream into several copies of the input video stream. According to the illustrated example, reference source video stream 516 is duplicated into three reference source video streams denoted 522, 523, and 524 that are identical to reference source video stream 516. Video stream 522 is sent to module 532, video stream 523 is sent to module 533, and video stream 524 is sent to module 534.

Module 570 determines the quantization parameter of the source video stream 516. According to particular embodiments, the quantization parameter is defined in the standard H.264/AVC Video Coding Standard. It takes a value between 0 and 51. The quantization parameter may be used as a reference parameter (preferably to a compression quality which depends on the manufacturer and on the model of the input device). The determined quantization parameter, denoted QP_tested_src_conf, is sent to module 580.

Like modules 332, 333, and 334 in FIG. 3, modules 532, 533, and 534 are virtual video transcoders. A different VBR virtual encoder configuration (i.e. a virtual video configuration for which the bitrate control is set to VBR) is associated with the virtual video encoder included in each of the virtual video transcoders 532 to 534.

As illustrated, virtual video transcoder 532 processes reference source video stream 522 to generate virtual video stream 542, virtual video transcoder 533 processes reference source video stream 523 to generate virtual video stream 543, and virtual video transcoder 534 processes reference source video stream 524 to generate virtual video stream 544.

Virtual video stream 542 is transmitted to module 552 which compares this virtual video stream with source video stream 513. The comparison may be based on a full-reference metric used in computer vision in order to assess the image visual quality such as the Peak Signal-to-Noise Ratio (PSNR) or the Structural Similarity Image Metric (SSIM), it being observed that the metric used in module 552 (and in modules 553 and 554) may be different from the one used in modules 352, 353, and 354.

The result of the comparison is a similarity distance.

Likewise, virtual video stream 543 is transmitted to module 553 which compares this virtual video stream with source video stream 513, and virtual video stream 544 is transmitted to module 554 which compares this virtual video stream with source video stream 513.

Module 560 receives the similarity distances. It selects the virtual encoder configuration associated with the highest similarity distance (i.e., the virtual encoder configuration that generates the virtual stream that is the most similar to source video stream 513). The quantization parameter (corresponding to the compression quality) of the selected virtual encoder configuration, denoted QP_tested_virtual_conf, is sent to module 580.

In turn, module 580 updates the look-up table associated with the source device 510 with a bitrate control set to VBR.

Table 1 of the Appendix illustrates an example of a VBR look-up table associated with a source device having a bitrate control set to VBR. In this example, each line of the look-up table corresponds to a source encoder configuration (tested_VBR_cont) identified by its compression quality. For the sake of illustration, the look-up table comprises three columns, each line corresponding to a particular source encoder configuration (tested_VBR_cont). The first column is used to store a compression quality (tested_conf_quality), the second one is used to store the quantization parameter of the source device (QP_tested_src_cont), and the third one is used to store the quantization parameter of the selected virtual encoder (QP_tested_virtual_cont).

When updating such a look-up table, module 580 adds a line to the look-up table, corresponding to the source encoder configuration being evaluated.

For the sake of illustration, it may be assumed that the compression quality of a given camera may be set according to one of five values (configurations 1 to 5). Each value corresponds to a tested_conf_quality value and corresponds to a line in the look-up table. For a given value (for example quality 1), module 570 determines the corresponding quantization parameter (QP_tested_src_conf) associated with the source video encoder. For example, it may be the value 20. Moreover, module 560 determines the quantization parameter corresponding to quality 1 of the selected virtual encoder configuration QP_tested_virtual_conf. For example, it may be the value 23. Therefore, the first line of the look-up table contains the values 1, 20, and 23 in the three columns, respectively.

Figure 6:
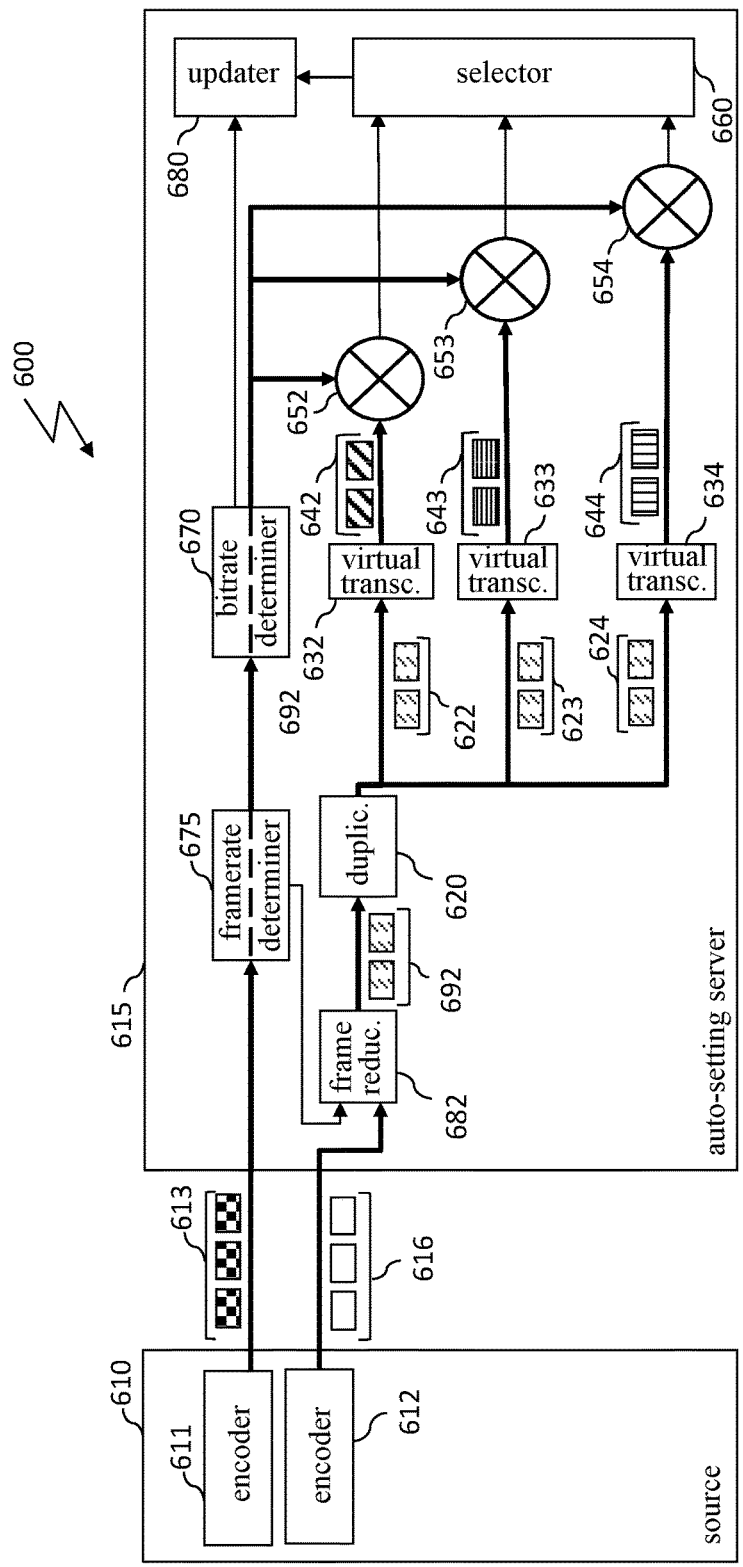
FIG. 6 is a block diagram of an example of a system for building a look-up table of a source device having a bitrate control set to constant bit rate.

FIG. 6 is a block diagram of an example of a system for building a look-up table of a source device having a bitrate control set to Constant Bit Rate (CBR).

A CBR look-up table makes the correspondence between a list of source encoder configurations and the corresponding selected virtual encoder configurations when the bitrate control of the source device is set to CBR.

This table makes it possible to determine, for a given source encoder configuration, a virtual encoder configuration for which the corresponding virtual encoder generates the closest virtual stream from a source video stream generated by the source video encoder set with the given source encoder configuration. According to particular embodiments, determination of the closest virtual stream comprises determining similarities based on a full-reference metric such as Peak Signal-to-Noise Ratio (PSNR) and Structural Similarity Image Metric (SSIM).

As illustrated, system 600 comprises one source device 610 (for example one source device chosen among the source devices illustrated in FIG. 1) and an auto-setting server 615 (for example the auto-setting server 160 illustrated in FIG. 1).

For the sake of illustration, source device 610 contains two source video encoders denoted 611 and 612. Source video encoder 611 is set according to a given source encoder configuration (different from the reference source encoder configuration), denoted tested_CBR_conf, for which the bitrate control is set to CBR. The source encoder configuration tested_CBR_conf may be identified by its target bitrate. The target bitrate of the encoder configuration tested_CBR_conf is denoted tested_conf_bit_rate.

Source video encoder 611 generates a source video stream 613 which is sent to module 675.

Source video encoder 612 is set with the reference source encoder configuration. It generates reference source video stream 616 which is sent to module 682.

Module 675 determines the frame rate of the source video stream 613. It is denoted tested_fps. This parameter is sent to module 682. Furthermore, module 675 forwards source video stream 613 to module 670.

Module 670 determines the target bitrate parameter of the source video stream 613. The determined target bitrate, denoted bit_rate_tested_src_conf, is sent to module 680. It is to be noted that the determined target bitrate can be different from the target bitrate tested_conf_bit_rate since the target bitrate is not necessarily the one applied by the source device.

Module 682 is a frame reduction module making it possible to decrease the number of frames within a video stream.

More specifically, module 682 receives as inputs a given video stream coded with an original frame rate, denoted src_fps, and a frame rate parameter corresponding to the target frame rate to achieve after the reduction. The frame reduction module reduces the src_fps frame rate of the given video stream to output a video stream having the target frame rate.

According to particular embodiments, the input video stream of module 682 corresponds to the reference source video stream (616) set with the highest frame rate supported by the source video encoder and the frame rate to achieve after the reduction is the frame rate of the source video stream 613 (i.e. tested_fps) as determined by module 675. As a consequence, the src_fps frame rate is necessarily higher than the frame rate of video stream 613 to achieve after the reduction.

As illustrated, module 682 generates video stream 692 that is sent to module 620.

Like module 320 described in reference to FIG. 3, module 620 aims at duplicating an input video stream into several copies of the input video stream. According to the illustrated example, reference source video stream 616 is duplicated, after its frame rate has been reduced to the one of the source video stream 613 in module 682, into three reference source video streams denoted 622, 623, and 624 that are identical to video stream 692. Video stream 622 is sent to module 632, video stream 623 is sent to module 633, and video stream 624 is sent to module 634.

Like modules 332, 333, and 334 in FIG. 3, modules 632, 633, and 634 are virtual video transcoders.

A different virtual encoder configuration having the bitrate control set to CBR is associated with each virtual video encoder included in virtual video transcoders 632, 633, and 634.

According to particular embodiments, none of the virtual transcoders 632, 633, and 634 modifies the frame rate which means that the frame rate of the input video stream is the same as the frame rate of the output video stream generated by the virtual transcoder. To that end, a setting is made in each virtual video encoder so that it cannot modify the frame rate parameter.

As illustrated, virtual video transcoder 632 processes video stream 692 to generate virtual video stream 642, virtual video transcoder 633 processes video stream 693 to generate virtual video stream 643, and virtual video transcoder 634 processes video stream 694 to generate virtual video stream 644. Due to the setting of the virtual encoders, the frame rate of video streams 642, 643, and 644 is the same as the frame rate of source video stream 613.

Virtual video stream 642 is transmitted to module 652 which compares this virtual video stream with source video stream 613. The comparison may be based on a full-reference metric used in computer vision in order to assess the image visual quality, such as the Peak Signal-to-Noise Ratio (PSNR) and the Structural Similarity Image Metric (SSIM).

The result of the comparison is a similarity distance.

Likewise, virtual video stream 643 is transmitted to module 653 which compares this virtual video stream with source video stream 613 and virtual video stream 644 is transmitted to module 654 which compares this virtual video stream with source video stream 613.

Module 660 receives the similarity distances. It selects the virtual encoder configuration with the highest similarity distance (i.e., the virtual encoder configuration that generates the virtual stream that is the most similar to source video stream 613). The target bitrate of the selected virtual encoder configuration, denoted bit_rate_tested_virtual_conf, is sent to module 680.

In turn, module 680 updates the look-up table of source device 610 having a bitrate control set to CBR. This can be done by adding a line in the table, corresponding to the source encoder configuration being tested (i.e. the configuration of the source video encoder 612).

Table 2 in the Appendix illustrates an example of a CBR look-up table of a source device having a bitrate control set to CBR. Each line of this look-up table corresponds to a CBR source encoder configuration (tested_CBR_cont) identified by its target bitrate. For the sake of illustration, the look-up table comprises four columns for storing four elements corresponding to the source encoder configuration tested_CBR_conf. The first column is used to store the tested target bitrate tested_conf_bit_rate, the second column is used to store the target bitrate parameter bit_rate_tested_src_conf, the third column is used to store the target bitrate parameter bit_rate_tested_virtual_conf, and the fourth column is used to store the frame rate parameter tested_fps.

FIG. 7 is a flowchart representing steps of an algorithm that may be used for building a look-up table of a source device according to embodiments of the invention.

It is advantageously carried out for each source device and for each bitrate control (e.g. "VBR" and "CBR"). For the sake of clarity, the considered source device is denoted test_src_device.

It is based on the block diagram as described in reference to FIG. 5 when the considered bitrate control is "VBR" and on the block diagram as described in reference to FIG. 6 when the considered bitrate control is "CBR". It may be implemented in auto-setting server 515 or 615.

As set forth above, a look-up table makes a correspondence between each source encoder configuration of a list of source encoder configurations and a corresponding selected virtual encoder configuration. The list of source encoder configurations included in the look-up table is denoted src_enc_conf_lst. More specifically, when the considered bitrate control is "CBR", the src_enc_conf_lst list is denoted cbr_src_enc_conf_lst and each source encoder configuration is referred to as a CBR source encoder configuration. When the considered bitrate control is "VBR", the src_enc_conf_lst list is denoted vbr_src_enc_conf_lst and each source encoder configuration is referred to as a VBR source encoder configuration.

Similarly, a list of virtual encoder configurations, denoted virtual_enc_conf_lst, may be defined. The length of the virtual_enc_conf_lst list is denoted Nb_virtual_conf. When the considered bitrate control is "CBR", the virtual_enc_conf_lst list is denoted cbr_virtual_enc_conf_lst and each virtual encoder configuration is referred to as a CBR virtual encoder configuration. When the considered bitrate control is "VBR", the virtual_enc_conf_lst list is denoted vbr_virtual_enc_conf_lst and each virtual encoder configuration is referred to as a VBR virtual encoder configuration.

The settable encoding parameters of the VBR source encoder configurations of the vbr_src_enc_conf_lst list are set to the settable encoding parameters of the reference source encoder except for the compression quality parameter. Each VBR source encoder configuration has a different compression quality parameter so as to test different values in the range of possible values. In practice, the vbr_src_enc_conf_lst list may be built by remotely retrieving the range of the compression quality parameter of the source device and uniformly selecting a plurality of values in the range. The number of selected values may be predetermined. A vbr_src_enc_conf_lst list is advantageously built for each source device of the VS system. Each vbr_src_enc_conf list may be stored in an auto-setting server (for example in RAM 250 in FIG. 2).

The vbr_virtual_enc_conf_lst list contains only the values of one parameter, for example the compression quality parameter which corresponds to the quantization parameter defined in the standard H.264/AVC Video Coding Standard (also known as MPEG-4 Part 10/AVC for Advanced Video Coding). It is preferably predetermined. Typically, the vbr_virtual_enc_conf_lst list contains all the quantization values defined in the standard H.264/AVC Video Coding Standard, that is to say all the values from 0 to 51. It is to be noted here that there is only one vbr_virtual_enc_conf_lst list (i.e. it is not dedicated to one source device).

The settable encoding parameters of the CBR source encoder configurations of the cbr_src_enc_conf_lst list are set to the settable encoding parameters of the reference source encoder conception except the bitrate control sets to CBR and the target bitrate parameter. Each CBR source encoder configuration has a different target bitrate parameter so as to test different values on the range of available values. In practice, the cbr_src_enc_conf_lst list may be built by remotely retrieving the range of the target bitrate parameter of the source device and uniformly selecting a plurality of values in the range. The number of selected values is preferably predetermined. A cbr_src_enc_conf_lst list is preferably built for each different source device of the VS system. Each cbr_src_enc_conf list may be stored in an auto-setting server (for example in RAM 250 in FIG. 2).

The cbr_virtual_enc_conf_lst list contains only the values of one parameter, for example the target bitrate parameter. It is preferably predetermined and may contain, for instance, a plurality of typical data rate values for a source device, for instance between 1 and 50 Mb/s. It is to be noted that there is only one cbr_virtual_enc_conf_lst list (i.e. it is not dedicated to one source device).

As illustrated in FIG. 7, the src_enc_conf_lst list of source encoder configurations is retrieved (step 702), for example from RAM 250 in FIG. 2, according to the considered source device and the considered bitrate control. The src_enc_conf_lst list is the vbr_src_enc_conf_lst list if the bitrate control is set to "VBR" or the cbr_src_enc_conf_lst list if the bitrate control is set to "CBR".

Next, a first source encoder configuration, denoted src_enc_conf, is selected (step 705). It is selected in the src_enc_conf_lst list. It is either a VBR source encoder configuration if the src_enc_conf_lst list is the vbr_src_enc_conf_lst list or a CBR source encoder configuration if the src_enc_conf_lst list is the cbr_src_enc_conf_lst list.

In a following step, a source video stream is retrieved based on the src_enc_conf configuration (step 710). It is referred to as the test source video stream. This step is described in more detail by reference to FIG. 8. If the bitrate control is set to VBR, the quantization parameter of the retrieved source video stream is determined by module 570 as described by reference to FIG. 5. It is denoted QP_tested_src_conf. Alternatively, if the bitrate control is set to CBR, the frame rate of the retrieved source video stream is determined by module 680 as described by reference to FIG. 6. It is denoted tested_fps. Moreover, the target bitrate parameter of the retrieved source video stream is determined by module 670 as described by reference to FIG. 6. It is denoted bit_rate_tested_src_conf.

In parallel to step 710 (or before or after this step), a reference source video stream of the test_src_device source device is retrieved (step 720). This step is described in more detail by reference to FIG. 8.

Next, the reference source video stream retrieved during step 720 is transcoded by each of the virtual video transcoders (step 725). To that end, the reference source video stream is duplicated nb_virtual_conf times to generate nb_virtual_conf virtual copies (e.g. modules 520 and 620 in FIGS. 5 and 6, respectively). Each virtual copy is sent to a virtual video encoder (e.g. modules 532, 533, and 534 in FIG. 5 or modules 632, 633, and 634 in FIG. 6) that is set with one of the virtual encoder configurations contained in the list virtual_enc_conf_lst (the number of virtual encoders being equal to nb_virtual_conf).

More precisely, if the bitrate control is set to CBR, the frame rate of each virtual copy is reduced (e.g. in modules 682, 683, and 684 in FIG. 6) to be set to tested_fps. Next, each modified virtual copy is sent to a dedicated virtual video transcoder, each one being set to a CBR virtual encoder configuration of the cbr_virtual_enc_conf_lst list. Again, it is to be noted that the virtual video transcoders are set so as to not modify the frame rate. If the bitrate control is set VBR, each copy is sent to a dedicated virtual video transcoder that is set with a dedicated VBR virtual encoder configuration of the vbr_virtual_enc_conf_lst list.

Next, during step 730, a similarity distance between each virtual video stream generated by the virtual video transcoders during step 725 and the test source video stream (e.g. the test source video stream outputted by modules 552, 553, and 553 in FIG. 5 if the bitrate control is set to VBR or by modules 652, 653, and 653 in FIG. 6 if the bitrate control is set to CBR) is computed.

Next, a virtual encoder configuration (and respectively a virtual encoder) is selected based on the similarity distances computed during step 730 (step 740). The virtual encoder configuration corresponding to the highest similarity distance is preferably selected. If the bitrate control is set to VBR, the quantization parameter (corresponding to the compression quality) of the selected virtual encoder configuration is referred to as QP_tested_virtual_conf. If the bitrate control is set to CBR, the target bitrate of the selected virtual encoder configuration is referred to as bit_rate_tested_virtual_conf.

In a following step, the look-up table is updated based on the results obtained during step 740 (step 750). For the sake of example, this step may be carried out by module 580 in FIG. 5 if the bitrate control is set to VBR and by module 680 in FIG. 6 if the bitrate control is set to CBR.

After having updated the look-up table, a test is performed to determine whether or not all the source encoder configurations of the src_enc_conf_lst list have been tested (step 760). If all the source encoder configurations of the src_enc_conf_lst list have not been tested, a new video encoder configuration not yet tested is selected from the src_enc_conf_lst list (step 770) and the algorithm returns to step 710. Otherwise the algorithm ends, the look-up table being built.

Figure 8:
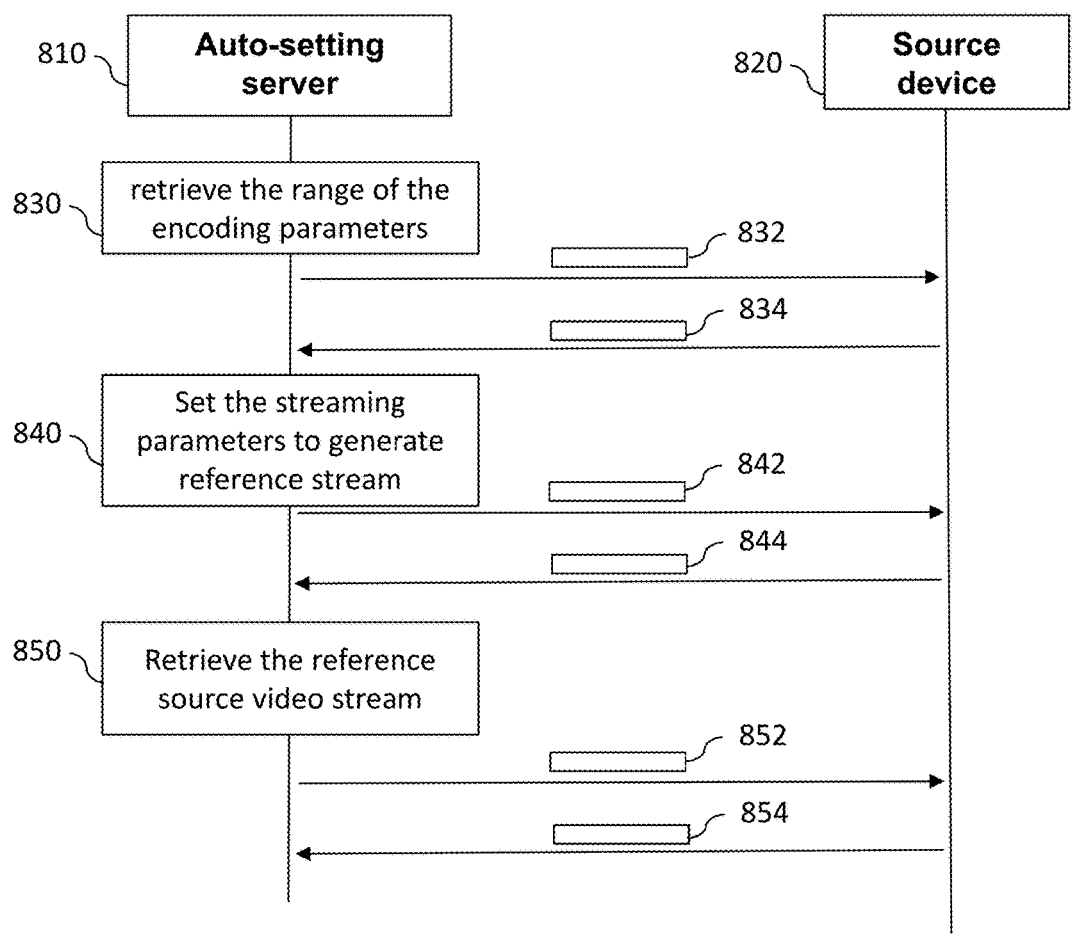
FIG. 8 illustrates a sequence of message exchanges for retrieving a reference source video stream of a source device.

FIG. 8 illustrates a sequence of message exchanges for retrieving a reference source video stream of a source device. More specifically, FIG. 8 illustrates the messages exchanged between an auto-setting server 810 such as auto-setting server 315 in FIG. 3 and a source device 820 such as source device 310 in FIG. 3.

For the sake of illustration, the standard known as ONVIF 1 (Open Network Video Interface Forum) can be used, in particular the service ONVIF Media Service WSDL (http://www.onvif.org/ver10/media/wsdl).

The retrieval of a reference source video is performed in three steps:

the retrieval of the range of the encoding parameters (step 830);

the setting of the encoding parameters in the source device (step 840); and the retrieval of the reference source video stream (step 850).

To retrieve the range of the encoding parameters (step 830), auto-setting server 810 sends a request denoted 832 to source device 820.

From an implementation point of view and using the ONVIF standard, request 832 is based on the Get VideoEncoderConfigurationOptions operation which returns the available options. At reception of request 832, source device 820 retrieves the range of its encoding parameters and sends response 834 containing this information. With the ONVIF standard, response 834 is contained in a Get VideoSourceConfigurationOptionsResponse message.

After having received response 834, auto-setting server 810 determines the reference source encoder configuration. Based on the retrieved ranges, it selects the maximum resolution (or one of the maximum resolutions) supported by the source video encoder, the maximum frame rate supported by the source video encoder (or one of the maximum supported frame rates), the "best" (or one of the best) H264 profile supported by the source video encoder (i.e. the "high" profile or, if not available, the "main" profile, or, if not available, the "baseline" profile), and the maximum quality supported by the source video encoder corresponding to the lowest compression (or one the maximum qualities supported by the source video encoder corresponding to one of the lowest compressions).

Once the reference source encoder configuration has been determined, the encoding parameters are set in the source device (step 840). To that end, auto-setting server 810 sends request 842 to set source device 820 with the reference encoder configuration. Using the ONVIF standard, request 842 is based on the SetVideoEncoderConfiguration operation. Upon reception of request 842, source device 820 modifies its current encoder configuration to set the reference encoder configuration and sends response 844 to confirm the modification of the encoder configuration. Using the ONVIF standard, response 844 is contained in a Set VideoEncoderConfigurationResponse message.

Upon reception of response 844, auto-setting server 810 is aware that the current source encoder configuration used by source device 820 is the reference encoder configuration. As a consequence, the reference source video stream may be retrieved (step 850). To that end, auto-setting server 810 sends request 852 to source device 820 in order to retrieve the current video stream. It is to be noted that each manufacturer proposes a dedicated web service to perform this operation. At the reception of request 852, source device 1120 sends video stream 854.

When the auto-setting server needs to retrieve a source video stream with a requested source encoder configuration, only the steps 840 and 850 are performed. In step 840, the reference encoder configuration is replaced by the requested source encoder configuration.

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

APPENDIX

TABLE 1 example of a VBR look-up table associated with a source device having a bitrate control set to VBR

| Compression quality | Camera QP | Emulated QP |
|---|---|---|
| | | |
| | | |
| | | |
| | | |
| | | |
| | | |

TABLE 2 example of a CBR look-up table associated with a source device having a bitrate control set to CBR

| Tested target bitrate | Camera target bitrate | Virtual target bitrate | Camera frame rate |
|---|---|---|---|
| | | | |
| | | | |
| | | | |
| | | | |
| | | | |
| | | | |
| | | | |

The invention claimed is:

1. A method of configuring a video source comprising an embedded encoder for generating a stream, the embedded encoder having at least one configuration parameter, at least one configuration parameter value making it possible to generate a reference stream, in a video-surveillance system comprising at least one virtual encoder configured to generate a plurality of virtual streams each corresponding to a distinct encoding configuration, each of the virtual streams being generated from a reference stream generated by the video source, the method comprising:
- transcoding a reference stream generated by the video source to generate virtual streams according to distinct encoding configurations of the at least one virtual encoder;
- for each of the generated virtual streams, computing a similarity distance between the corresponding virtual stream and a reference stream generated by the video source;
- obtaining a quality indicator relative to a task to be carried out on a stream generated by the video source;
- selecting an encoding configuration of the at least one virtual encoder based on the computed similarity distances and the obtained quality indicator; and
- determining at least one configuration parameter value of the encoder of the video source as a function of the selected encoding configuration of the at least one virtual encoder and of a look-up table.

2. The method of claim 1, further comprising a step of generating the look-up table, the step of generating the look-up table comprising:
- retrieving a stream generated by the embedded encoder of the video source configured with at least one predetermined parameter value;
- transcoding the reference stream by using each of the distinct encoding configurations of the at least one virtual encoder so as to obtain virtual streams; and
- selecting an encoding configuration of the at least one virtual encoder based on similarity distances between the retrieved stream and the virtual streams.

3. The method of claim 2, wherein the step of generating the look-up table further comprises:
- obtaining a list of streams, each stream of the list of streams being generated by the embedded encoder of the video source configured with at least one predetermined distinct parameter value;
- retrieving each stream of the list of streams; and
- for each retrieved stream, selecting an encoding configuration of the at least one virtual encoder based on similarity distances between the retrieved streams and the virtual streams.

4. The method of claim 2, wherein the step of generating the look-up table further comprises a step of computing similarity distances between a retrieved stream and the virtual streams.

5. The method of claim 1, further comprising a step of generating the look-up table and a step of computing a quantization parameter from a stream generated by the embedded encoder, the quantification parameter characterizing the configuration of the embedded encoder.

6. The method of claim 1, further comprising a step of generating the look-up table, wherein the distinct encoding configurations of the at least one virtual encoder are distinct variable bitrate encoding configurations.

7. The method of claim 1, further comprising a step of generating the look-up table, wherein the look-up table comprises links between values of a compression quality parameter of a retrieved stream, of a quantization parameter of the embedded encoder, and of a quantization parameter of a selected virtual encoder.

8. The method of claim 1, further comprising a step of generating the look-up table and a step of computing a target bitrate from a stream generated by the embedded encoder, the target bitrate characterizing the configuration of the embedded encoder.

9. The method of claim 1, further comprising a step of generating the look-up table, wherein the reference stream has a frame rate and a stream generated by the embedded encoder has a frame rate, wherein the frame rate of the reference stream is modified to be set to the frame rate of a stream generated by the embedded encoder and wherein the distinct encoding configurations of the at least one virtual encoder are distinct constant bitrate encoding configurations.

10. The method of claim 1, further comprising a step of generating the look-up table, wherein the look-up table comprises links between values of a target bit rate of a retrieved stream, of a target bit rate of the embedded encoder, of a target bit rate of a selected virtual encoder, and of a frame rate of the embedded encoder.

11. The method of claim 1, wherein computation of a similarity distance is based on a full-reference metric used in computer vision in order to assess the image visual quality such as the Peak Signal-to-Noise Ratio (PSNR) and the Structural Similarity Image Metric (SSIM).

12. The method of claim 1, wherein the video-surveillance system comprises a plurality of virtual encoders, each virtual encoder of the plurality of virtual encoders being configured according to a distinct encoding configuration of the distinct encoding configurations, or wherein the video-surveillance system comprises one virtual encoder, the virtual encoder being sequentially configured according to each of the distinct encoding configurations.

13. A non-transitory computer-readable storage medium storing instructions of a computer program for implementing the method according to claim 1.

14. A device for configuring a video source comprising an embedded encoder for generating a stream, the embedded encoder having at least one configuration parameter, at least one configuration parameter value making it possible to generate a reference stream, in a video-surveillance system comprising at least one virtual encoder configured to generate a plurality of virtual streams each corresponding to a distinct encoding configuration, each of the virtual streams being generated from a reference stream generated by the video source, the device comprising a microprocessor configured for carrying out the steps of:
- transcoding a reference stream generated by the video source to generate virtual streams according to distinct encoding configurations of the at least one virtual encoder;
- for each of the generated virtual streams, computing a similarity distance between the corresponding virtual stream and a reference stream generated by the video source;
- obtaining a quality indicator relative to a task to be carried out on a stream generated by the video source;
- selecting an encoding configuration of the at least one virtual encoder based on the computed similarity distances and the obtained quality indicator; and
- determining at least one configuration parameter value of the encoder of the video source as a function of the selected encoding configuration of the at least one virtual encoder and of a look-up table.

15. The device of claim 14, wherein the microprocessor is further configured for carrying out a step of generating the look-up table, and wherein the microprocessor is configured so that the step of generating the look-up table comprises:
- retrieving a stream generated by the embedded encoder of the video source configured with at least one predetermined parameter value;

transcoding the reference stream by using each of the distinct encoding configurations of the at least one virtual encoder so as to obtain virtual streams; and selecting an encoding configuration of the at least one virtual encoder based on similarity distances between the retrieved stream and the virtual streams.

16. The device of claim 15, wherein the microprocessor is configured so that the step of generating the look-up table further comprises:

obtaining a list of streams, each stream of the list of streams being generated by the embedded encoder of the video source configured with at least one predetermined distinct parameter value;

retrieving each stream of the list of streams; and for each retrieved stream, selecting an encoding configuration of the at least one virtual encoder based on similarity distances between the retrieved streams and the virtual streams.

17. The device of claim 15, wherein the microprocessor is configured so that the step of generating the look-up table further comprises a step of computing similarity distances between a retrieved stream and the virtual streams.

18. The device of claim 14, wherein the microprocessor is further configured for carrying out a step of generating the look-up table and a step of computing a quantization parameter from a stream generated by the embedded encoder, the quantification parameter characterizing the configuration of the embedded encoder.

19. The device of claim 14, wherein the microprocessor is further configured for carrying out a step of generating the look-up table and a step of computing a target bitrate from a stream generated by the embedded encoder, the target bitrate characterizing the configuration of the embedded encoder.

20. The device of claim 14, wherein the video-surveillance system comprises a plurality of virtual encoders, each virtual encoder of the plurality of virtual encoders being configured according to a distinct encoding configuration of the distinct encoding configurations, or wherein the video-surveillance system comprises one virtual encoder, the virtual encoder being sequentially configured according to each of the distinct encoding configurations.

* * * * *